UNITED STATES PATENT OFFICE.

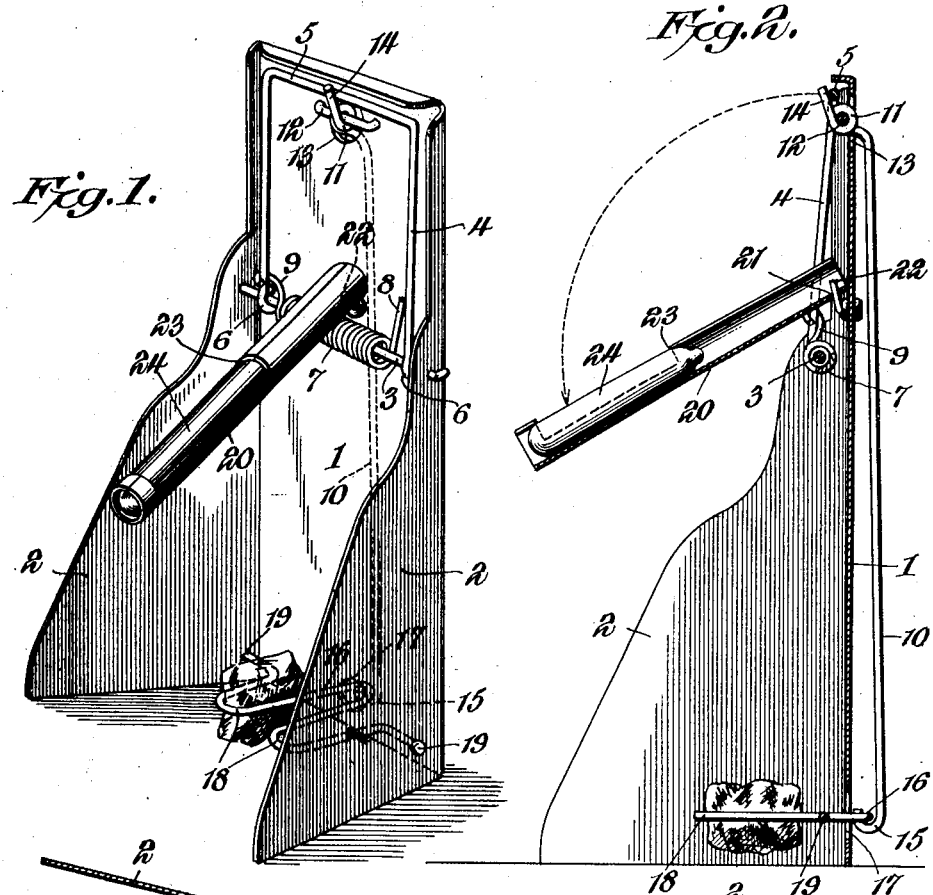
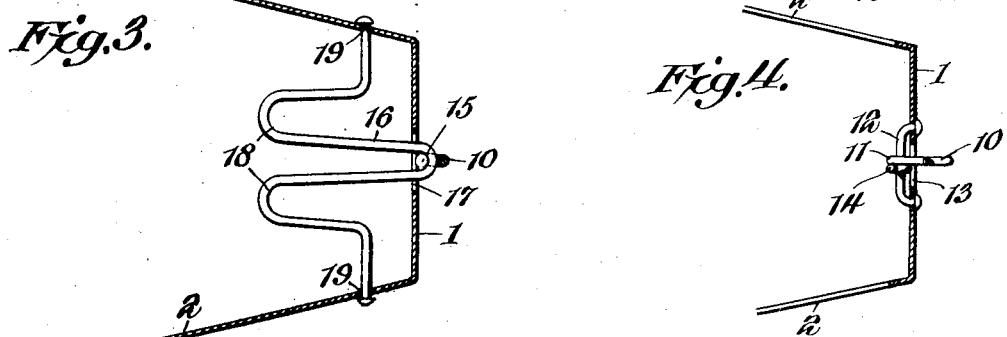

JAMES WRIGHT VAN METER, OF BUENOS AIRES, ARGENTINA.

ANIMAL-EXTERMINATOR.

1,347,310.　　　Specification of Letters Patent.　　Patented July 20, 1920.

Application filed July 23, 1915, Serial No. 41,591.　Renewed November 28, 1917.　Serial No. 204,454.

*To all whom it may concern:*

Be it known that I, JAMES WRIGHT VAN METER, citizen of the United States of America, and resident of Argentina, Calle Cangallo 666, Buenos Aires, have invented certain new and useful Animal-Exterminators, of which the following is a specification.

The invention relates to an improvement in animal exterminators, and the object is to provide means for discharging an agent on the body of the animal which emits an odor obnoxious to the animal, causing the animal to be frightened away.

A further object of this invention, is to eliminate the nuisances committed around houses, buildings and the like by cats and dogs, and prevent the carrying of diseases by such animals and rats, by frightening the animals away without doing them any bodily harm.

The invention consists of certain novel features of construction and combinations of parts which will be hereinafter described and pointed out in the claim. It is evident that changes in the form, proportion, material and minor details of construction within the scope of the appended claim, may be made without departing from the spirit or sacrificing any of the advantages of this invention.

In the accompanying drawings:—

Figure 1 is a perspective view of the invention;

Fig. 2 is a vertical sectional view.

Fig. 3 is a horizontal section view, showing the bait holder with the trigger in engagement therewith;

Fig. 4 is a horizontal sectional view, showing the manner of mounting the trigger on the frame or support.

The frame consists of a back 1, and sides 2, which extend at right angles to the back. Extending through the sides 2 and connected thereto is a rod 3, which is located slightly above the center of the sides and back.

A striker, consisting of parallel arms 4 and a transverse bar 5, is made U-shaped and connected to the rod 3, by the terminals of the arms 4, which are bent around the rod as at 6, for pivotally connecting the striker to the rod. A coiled spring 7 is mounted on the transverse rod 3, and a terminal 8 of the spring is adapted to engage the inner surface of the back 1, and the other terminal engages one of the arms 4, as at 9, for normally forcing the striker outward and away from the back 1.

A trigger 10 is located along the outer surface of the back 1, and consists of a vertical rod, having its upper terminal extending through an opening 13 formed in the upper portion of the back 1. Connected to the back 1, and located on the inner surface thereof in front of the opening 13 is a bar 12, around which the vertical rod 10 is bent as at 11, for pivotally connecting the rod to the bar. The upper end 14 of the vertical rod is adapted to engage the transverse bar 5 of the striker for holding the striker in operative position.

A bait holder made somewhat in the shape of a letter W, has the central U-shaped portion 16 thereof extending through an opening 17 formed at the lower portion of the back 1, and extending over the inturned hook or end 15 of the lower terminal of the rod 10, for retaining the striker in its operative position. The bait holder is bent laterally at 18 and then parallel with the portions 16, and the terminals are then bent at right angles as at 19. The terminals 19 are journaled in the sides 2 at the lower portion thereof.

A tube 20 is connected at one end to the back 1, above the spring 7 and rod 3, by a hook or pin 22, which extends through an opening 21 in the tube. The tube 20 is provided with an elongated slot 23, for exposing a glass or breakable tube 24 which is mounted therein. The glass tube 24 contains bisulfite of carbon, or some sulfuric compound and after the bisulfite of carbon or other agent has been placed in the tube, the tube is hermetically sealed. The tube is retained in the tube 20 by cement or other suitable means.

The bait holder has some suitable bait thereon, such as meat, which the animal will endeavor to remove, and upon the actuation of the bait holder, the vertical rod 10 will be released. The releasing of the rod 10, or trigger, permits the striker to become disengaged from the upper terminal or end 14 of the trigger, and as it is under the tension of the spring 7, the striker will be swung outwardly and downwardly, causing the transverse bar 5 thereof to come in contact with and break the tube 24, discharging the contents of the tube, such as bisulfite of carbon onto the animal.

An odor is emitted from the bisulfite of carbon which is obnoxious to the animals, and will frighten them away. The liquid when it is discharged from the tube 24 will come in contact with the body of the animal, so that a constant odor is being thrown off, which tends to frighten the animal, and when the liquid comes in contact with the body of a rat, and it seeks its hole, it will drive all of the rats in the hole therefrom, thereby ridding the premises of rats, cats, dogs and the like.

It will be seen from the foregoing that I have provided a device which can be manufactured at a small cost, as it is of simple construction, and is automatic in action, and not dangerous.

What is claimed is:—

A device of the class described comprising a frame having a back and sides, a transverse rod pivoted to the sides, a spring controlled striker pivoted on the rod between the sides, a trigger arranged against the outer face of the back and having its upper end extending forwardly through the back and pivotally connected thereto, said upper end of the trigger normally engaging the striker to hold it in set position, a W-shaped bait holder pivoted on the sides, and projecting through the back for engagement with the trigger to hold it in contact with the striker, said bait holder being adapted to be actuated by an animal to release the trigger and free the striker, and a liquid containing breakable tube mounted in the frame in the path of the striker and adapted to be broken thereby when the striker is freed from the trigger to release the liquid.

Signed at Buenos Aires, Argentine Republic, this fourth day of May, A. D. 1915.

JAMES WRIGHT VAN METER.

Witnesses:
 L. E. B. POOLE,
 THOMAS MCENELLY.